H. F. CLARK.
CARRIER FOR GLASS ARTICLES.
APPLICATION FILED APR. 9, 1921.
1,405,757. Patented Feb. 7, 1922.
2 SHEETS—SHEET 1.
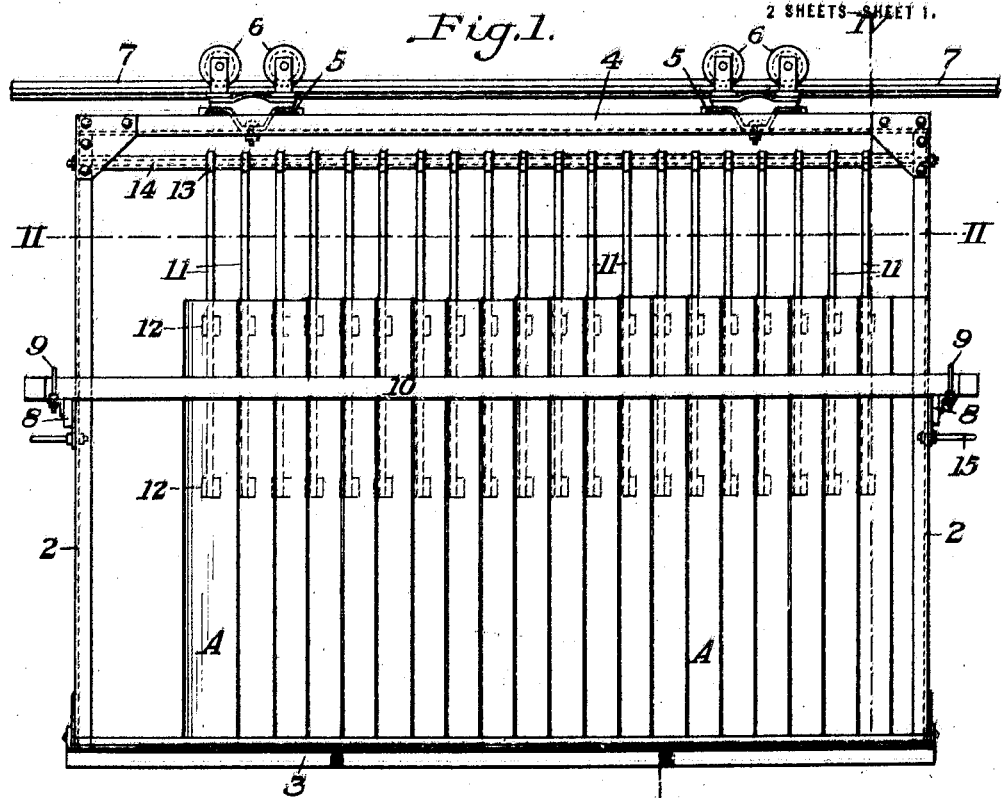
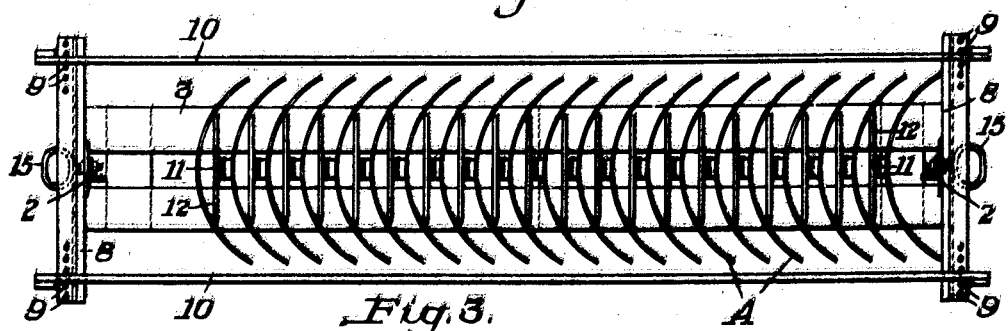
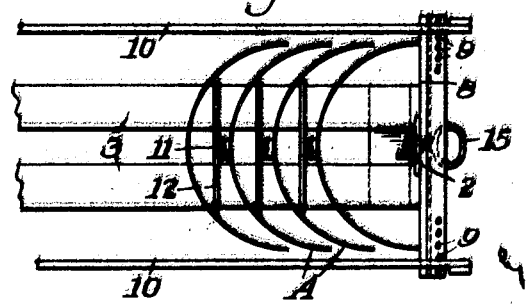
INVENTOR.
H. F. Clark

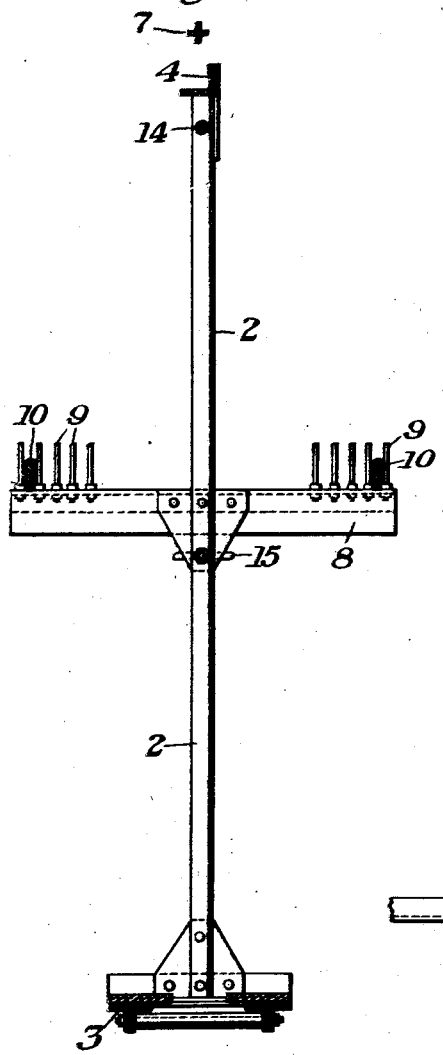
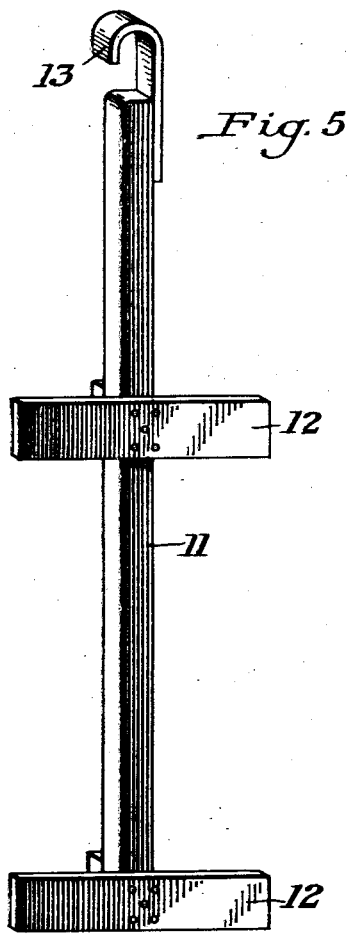
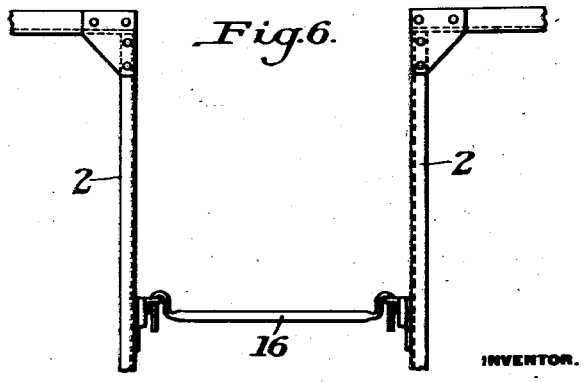

UNITED STATES PATENT OFFICE.

HENRY F. CLARK, OF OAKMONT, PENNSYLVANIA, ASSIGNOR TO WINDOW GLASS MACHINE COMPANY, OF PITTSBURGH, PENNSYLVANIA, A CORPORATION OF NEW JERSEY.

CARRIER FOR GLASS ARTICLES.

1,405,757.  Specification of Letters Patent.  Patented Feb. 7, 1922.

Application filed April 9, 1921. Serial No. 459,995.

*To all whom it may concern:*

Be it known that I, HENRY F. CLARK, a resident of Oakmont, Allegheny County, Pennsylvania, have invented a new and useful Improvement in Carriers for Glass Articles, of which the following is a full, clear, and exact description, reference being had to the accompanying drawings, forming part of this specification, in which:

Figure 1 is a side view of a carrier embodying my invention;

Figure 2 is a section on the line II—II of Figure 1;

Figure 3 is a partial section similar to Figure 2, but showing the device adapted for different sized glass shawls;

Figure 4 is a section on the line IV—IV of Figure 1;

Figure 5 is a perspective view of one of the spacers or separators; and

Figure 6 is a fragmentary detail view illustrating one way of connecting the carriers into trains.

My invention has relation to carriers for glass articles. In the manufacture of window glass and the like, the glass is drawn or blown into hollow cylinders. In the larger sizes of these cylinders, it is customary, before flattening them, to split them into two or more segments. These segments are commonly known as "shawls." The object of my invention is to provide a carrier of simple and convenient character and construction by means of which a plurality of shawls may be moved from place to place without breakage, as in moving them from the splitting room to the flattening ovens.

The nature of my invention will be best understood by reference to the accompanying drawings, in which I have shown the preferred embodiment thereof, and which will now be described. it being premised, however, that various changes can be made in the details of construction, arrangement and combination of the various parts, without departing from the spirit and scope of my invention as defined in the appended claims.

In these drawings, the numeral 2 designates the frame of the carrier, which may be, in general, of any suitable construction. In the drawing, it is shown as consisting of an upright at each end, these uprights supporting the bottom members 3, and being connected at their upper ends by the bar 4, to which is secured hangers 5, carrying wheels 6, which travel upon an overhead track 7. Secured to the intermediate portion of each end upright is a transverse bar 8, in each end portion of which is mounted a series of spaced pins 9. These pins form means for holding in position the guard rails or bars 10. These guard rails or bars are supported loosely between adjacent pins and may be moved from one set of pins to another so as to vary their distance apart as is desirable with different widths or sizes of shawls.

The numeral 11 designates spacers or separators each consisting of an upright member having transverse separating arms 12, secured thereto, and provided at the upper end with a hook 13, which slidably engages a rod or bar 14, extending longitudinally of the upper portion of the carrier between its end posts. The separators or spacers depend from this bar.

In use, the shawls shown at A in Figures 1 and 2, are set on end in the bottom members 3. After each shawl has been set in place, one of the spacers is moved in position to engage its convex side, and thus separate it from the next shawl to be placed on the carrier. In this way, a series of shawls partially nested in each other are placed upon the carrier throughout its length or any desired portion thereof.

Figure 2 illustrates the use of the device with smaller shawls, while in Figure 3 larger shawls A are shown, there being a corresponding adjustment of the guard rails 10.

The overhead track 7 extends to any desired point and the carriers may be provided with suitable handles 15 to facilitate pulling or pushing the carriers along the track. When desired, the end posts of two adjacent carriers may be connected by a suitable coupling, such as indicated at 16 in Figure 6, for the purpose of connecting the carriers into trains.

My invention provides a simple carrier by means of which a large number of shawls may be quickly and conveniently moved with safety from one position to another.

I claim:

1. A carrier for glass shawls, comprising a movable frame adapted to be suspended from and travel upon an overhead track, said frame having supporting means for a plurality of the shawls, and spacers or separators movably mounted on said frame and adapted to separate and space adjacent shawls, substantially as described.

2. A carrier for glass shawls, comprising a frame having means for supporting a plurality of shawls thereon in adjacent vertical positions, and separators movably mounted on the frame for separating and spacing adjacent shawls, each of said separators having means for engaging the concave face of a shawl, substantially as described.

3. A carrier for glass shawls, comprising a frame having means for supporting a plurality of shawls thereon in adjacent vertical positions, and separators movably mounted on the frame for separating and spacing adjacent shawls, together with laterally adjustable side guard rails on said frame, substantially as described.

4. A carrier for glass shawls, comprising a frame having a bottom portion adapted to support a plurality of shawls placed on end, adjacent to each other, a plurality of depending separators or spacers movable into positions to separate and space the shawls, and side guards on the frame for preventing lateral movement of the shawls, substantially as described.

In testimony whereof, I have hereunto set my hand.

HENRY F. CLARK.